(12) United States Patent
Chien et al.

(10) Patent No.: US 10,197,255 B2
(45) Date of Patent: Feb. 5, 2019

(54) RAIL-TYPE OLED LAMP ASSEMBLY

(71) Applicant: Industrial Technology Research Institute, Hsinchu (TW)

(72) Inventors: Heng-Chieh Chien, Hsinchu (TW); Yu-Lin Chao, Hsinchu (TW); Wen-Fu Hsu, Hsinchu (TW); Chih-Ming Shen, Hsinchu (TW); Chia-Wei Jui, Hsinchu (TW); Yao-Shun Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/479,733

(22) Filed: Apr. 5, 2017

(65) Prior Publication Data

US 2018/0128468 A1    May 10, 2018

(30) Foreign Application Priority Data

Nov. 11, 2016 (TW) .............................. 105136598 A

(51) Int. Cl.
*F21V 21/35* (2006.01)
*F21V 21/14* (2006.01)
(Continued)

(52) U.S. Cl.
CPC .......... *F21V 21/35* (2013.01); *F21V 19/0045* (2013.01); *F21V 23/06* (2013.01);
(Continued)

(58) Field of Classification Search
CPC .......... F21V 21/14; F21V 21/35; F21V 23/06; F21V 19/0045; F21Y 2115/15; H01R 25/142; H01R 25/147
See application file for complete search history.

(56) References Cited

U.S. PATENT DOCUMENTS 5,139,425 A    8/1992 Daviet et al.
6,343,943 B1   2/2002 Shen
(Continued)

FOREIGN PATENT DOCUMENTS

CN    201983207 U    9/2011
CN    102483218 A    5/2012
(Continued)

*Primary Examiner* — Alan B Cariaso
(74) *Attorney, Agent, or Firm* — Mintz Levin Cohn Ferris Glovsky and Popeo, P.C.; Peter F. Corless; Steven M. Jensen

(57) ABSTRACT

A rail-type organic light emitting diode lamp assembly is provided. The lamp assembly includes a lamp module, an annular member, a connector, a conductive member, and a rail module. The annular member includes a protrusion portion having a pair of indentations. The connector is connected to the annular member, and includes a through hole, a first end provided with a pair of ears and a second end provided with a pair of hooks. The conductive member is provided in the through hole and has a first end in contact with the annular conductive coil. The rail module is connected with the connector and includes a conductor in contact with a second end of the conductive member. The connector can be slidably hooked to the rail module through the hooks, and after the ears are inserted into the indentations, the annular member can be rotatable with respect to the connector.

21 Claims, 11 Drawing Sheets

(51) Int. Cl.
*F21V 23/06* (2006.01)
*F21V 19/02* (2006.01)
*F21V 19/00* (2006.01)
*H01R 25/14* (2006.01)
*F21Y 115/15* (2016.01)

(52) U.S. Cl.
CPC ............ *H01R 25/142* (2013.01); *F21V 21/14* (2013.01); *F21Y 2115/15* (2016.08)

(56) References Cited

U.S. PATENT DOCUMENTS

| | | | |
|---|---|---|---|
| 6,695,620 B1 | 2/2004 | Huang | |
| 2009/0279298 A1* | 11/2009 | Mier-Langner | F21V 21/096 362/235 |
| 2010/0124067 A1* | 5/2010 | Hente | F21V 21/096 362/398 |
| 2010/0271834 A1* | 10/2010 | Muessli | F21V 21/35 362/398 |
| 2010/0290215 A1* | 11/2010 | Metcalf | A47B 21/00 362/127 |
| 2013/0044501 A1* | 2/2013 | Rudisill | F21V 29/70 362/398 |
| 2014/0268835 A1* | 9/2014 | Rudisill | F21V 21/14 362/391 |
| 2017/0223440 A1* | 8/2017 | Rodrigues | H04R 3/12 |

FOREIGN PATENT DOCUMENTS

| | | |
|---|---|---|
| CN | 203240444 U | 10/2013 |
| CN | 104456469 A | 3/2015 |
| CN | 201629403 U | 9/2015 |
| CN | 205037172 U | 2/2016 |
| EP | 0396522 A2 | 11/1990 |
| TW | M399943 U | 3/2011 |
| TW | M469430 U | 1/2014 |
| TW | M504193 U | 7/2015 |
| TW | M504428 U | 7/2015 |
| TW | 201624178 A | 7/2016 |

* cited by examiner

RAIL-TYPE OLED LAMP ASSEMBLY

CROSS-REFERENCE TO RELATED APPLICATION

The present disclosure is based on, and claims priority from, Taiwan Application Number 105136598, filed Nov. 10, 2016, the disclosure of which is hereby incorporated by reference herein in its entirety.

TECHNICAL FIELD

The disclosure relates to organic light emitting diode (OLED) lamps, and relates to a rail-type OLED lamp assembly.

BACKGROUND

In the field of lighting technology, organic light-emitting diodes (OLEDs) have various advantages, such as self-emissive, a wide viewing angle, fast response time, a wide temperature range, high contrast, low power consumption and simple manufacturing process. Thus, in the manufacturing of lighting fixtures, OLEDs are gradually gaining attention. However, there are still rooms for improvement.

OLEDs are generally used in surface-type light source modules, and are more common in large-area lighting or situational lighting. Due to the diverse nature of the lighting application styles, coupled with the immaturity in the OLED lighting techniques, convenient electrical connections are not common. In simple terms, when applied to situational lighting, changes in the angle and position of the OLED lamps are often needed. For example, an OLED lamp assembly may have to be rotated in certain angle or moved to a particular location in order to illuminate a target object. However, in such mechanical movements, in addition to the connections between the lamp and the base, electrical connections also have to be considered. That is, when taking electrical connections into consideration, traditional OLED lamps are limited in its freedom of movement, i.e. lacking the ability to move or rotate freely, and may not be ideal in situational lighting. This means that if lighting fixtures require movement or rotation, OLED light fixtures may not be used.

SUMMARY

The disclosure provides a rail-type OLED lamp assembly, which may include: a lamp module including at least one annular conductive coil; an annular member connected with the lamp module and including a protrusion portion having a pair of indentations; a connector connected with the annular member and including at least one through hole, the connector comprising: a first end provided with a pair of ears; and a second end provided with a pair of hooks; a conductive member provided in the at least one through hole, a first end of the conductive member being in contact with the at least one annular conductive coil; and a rail module connected with the connector and including at least one conductor in contact with a second end of the conductive member, wherein the connector is slidably hooked to the rail module through the pair of hooks, and after the pair of ears are inserted into the pair of indentations, the annular member is rotatable with respect to the connector.

In an embodiment, the lamp module and the rail module are electrically connected through the connector. The conductive members in the connector are in contact with both the annular conductive coils of the lamp module and the conductors of the rail module. The annular conductive coils of the lamp module ensure electrical connection when the lamp module is rotating. In addition, the hooks of the connector ensure electrical connection with the elongated conductors when the lamp module is sliding across the rail module. Thus, the freedom of mechanical movement of the rail-type OLED lamp assembly of the present disclosure can be elevated, making it more useful in diverse situational lighting applications.

DETAILED DESCRIPTION

The disclosure is described by the following specific embodiments. Those with ordinary skills in the arts can readily understand other advantages and functions of the disclosure after reading the disclosure of this specification. The disclosure may also be practiced or applied with other different implementations. Based on different contexts and applications, the various details in this specification can be modified and changed without departing from the spirit of the disclosure.

Figure 1:
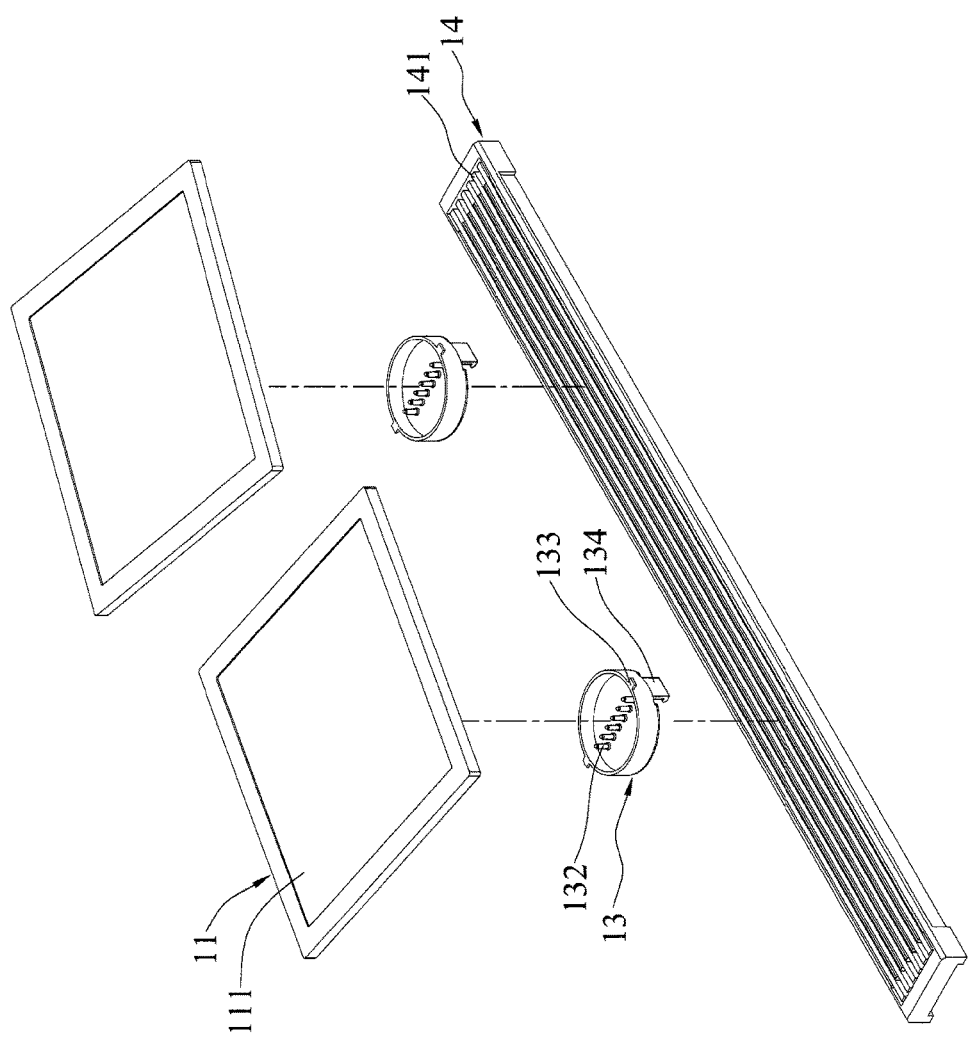
FIG. 1 is an exploded view of a rail-type OLED lamp assembly in accordance with the disclosure.

Referring to FIG. 1, an exploded view of a rail-type OLED lamp assembly 1 in accordance with the disclosure is shown. The rail-type OLED lamp assembly 1 includes a lamp module 11, an annular member 12 (shown in FIG. 4A), a connector 13 and a rail module 14.

Referring to FIGS. 1 to 4B, the rail-type OLED lamp assembly 1 is first briefly explained below.

The annular member 12 is provided at a side of the lamp module 11 closer to the rail module 14. The connector 13 has one side connected to the annular member 12, and the other side connected to the rail module 14. An external power supply provides power to the rail module 14. The connector 13 provides electrical connection between the rail module 14 and the lamp module 11. The connector 13 is engaged with the rail module 14 in such a way that it is slidable on the rail module 14. In other words, the connector 13 can slide across the rail module 14. A rotating mechanism is between the connector 13 and the annular member 12, so that the lamp module 11 may rotate with the annular member 12 with respect to the rail module 14. In an embodiment, more than one lamp module 11 may be provided on a rail module 14.

Figure 4A:
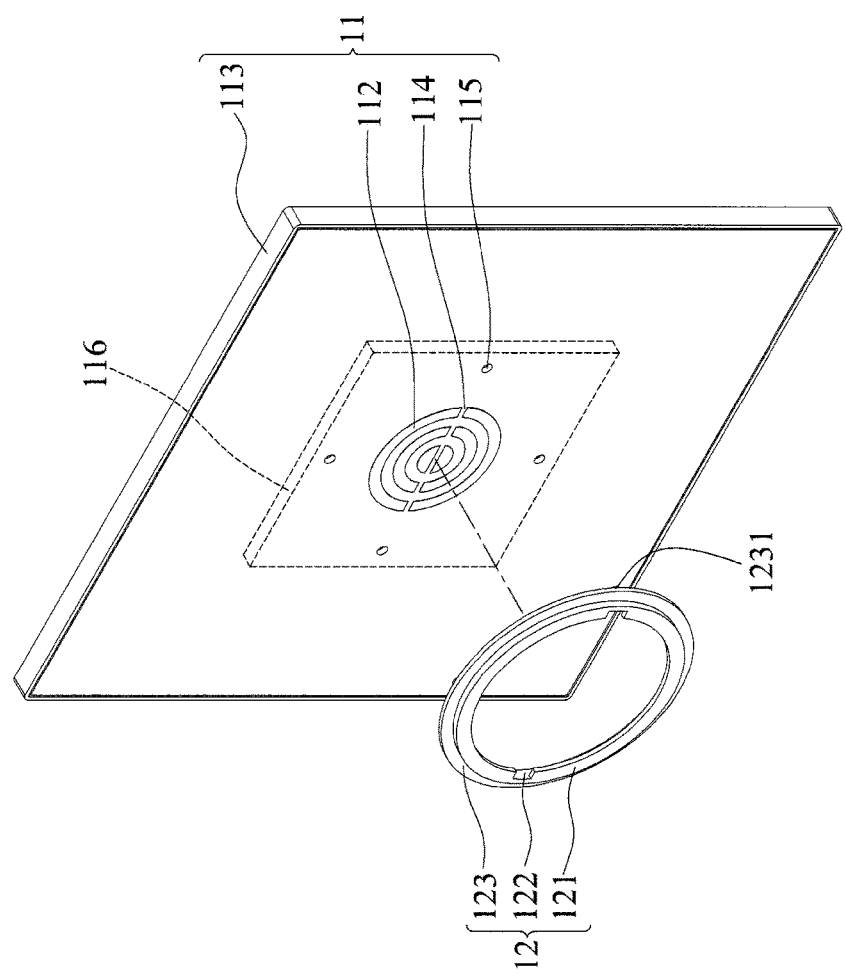
FIGS. 4A and 4B are diagrams illustrating a lamp module and an annular member of the rail-type OLED lamp assembly in accordance with the disclosure.

The lamp module 11 includes an OLED unit 111 and at least one annular conductive coil 112 (shown in FIG. 4A).

The at least one annular conductive coil 112 is provided at the side of the lamp module 11 facing the rail module 14, as shown in FIG. 4A.

The annular member 12 (shown in FIG. 4A) can be connected to the lamp module 11. The annular member 12 includes a protrusion portion 121 having a pair of indentations 122. The connector 13 is joined with the protrusion portion 121 of the annular member 12 and is rotatable.

The connector 13 is connected to the annular member 12. The connector 13 includes at least one through hole 131 (shown in FIG. 3A). Each of the through holes 131 is disposed with a conductive member 132. A first end of the conductive member 132 is in contact with the annular conductive coils 112 of the lamp module 11. A pair of ears is provided on a first end of the connector 13 horizontally, and a pair of hooks 134 is provided on a second end of the connector 13 vertically. The pair of ears 133 of the connector 13 is inserted into the pair of indentations 122 of the annular member 12, such that the connector 13 is rotatable within the protrusion portion 121 of the annular member 12.

The rail module 14 is connected with the connector 13. The rail module 14 includes at least one conductor 141, such that second ends of the conductive members 132 are in contact with the conductors 141, and the pair of hooks 134 of the connector 13 are hooked to the rail module 14, so that the connector 13 can slide across the rail module 14.

The lamp module 11, the annular member 12, the connector 13 and the rail module 14 are described with reference to FIGS. 2 to 4.

Figure 2A:
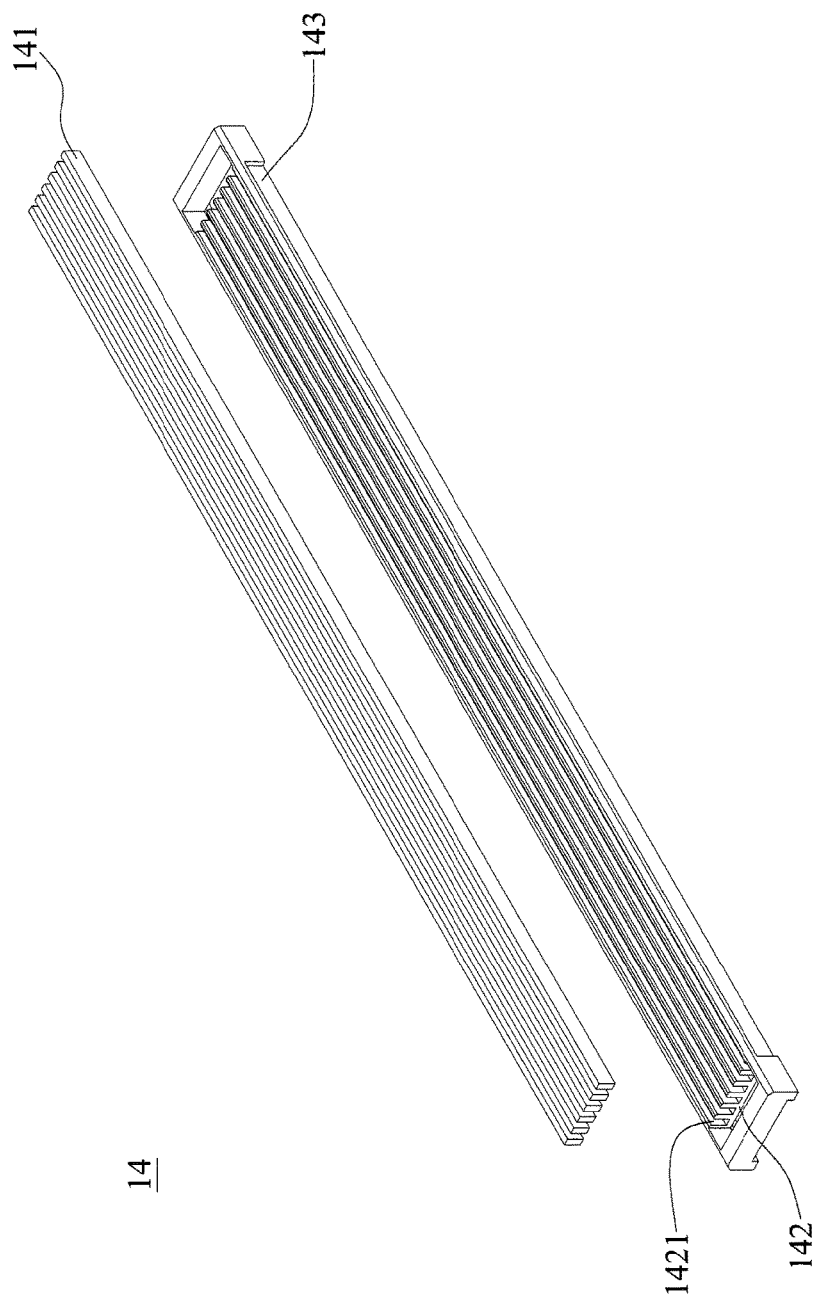
FIGS. 2A and 2B are diagrams illustrating a rail module of the rail-type OLED lamp assembly in accordance with the disclosure.
Figure 2B:
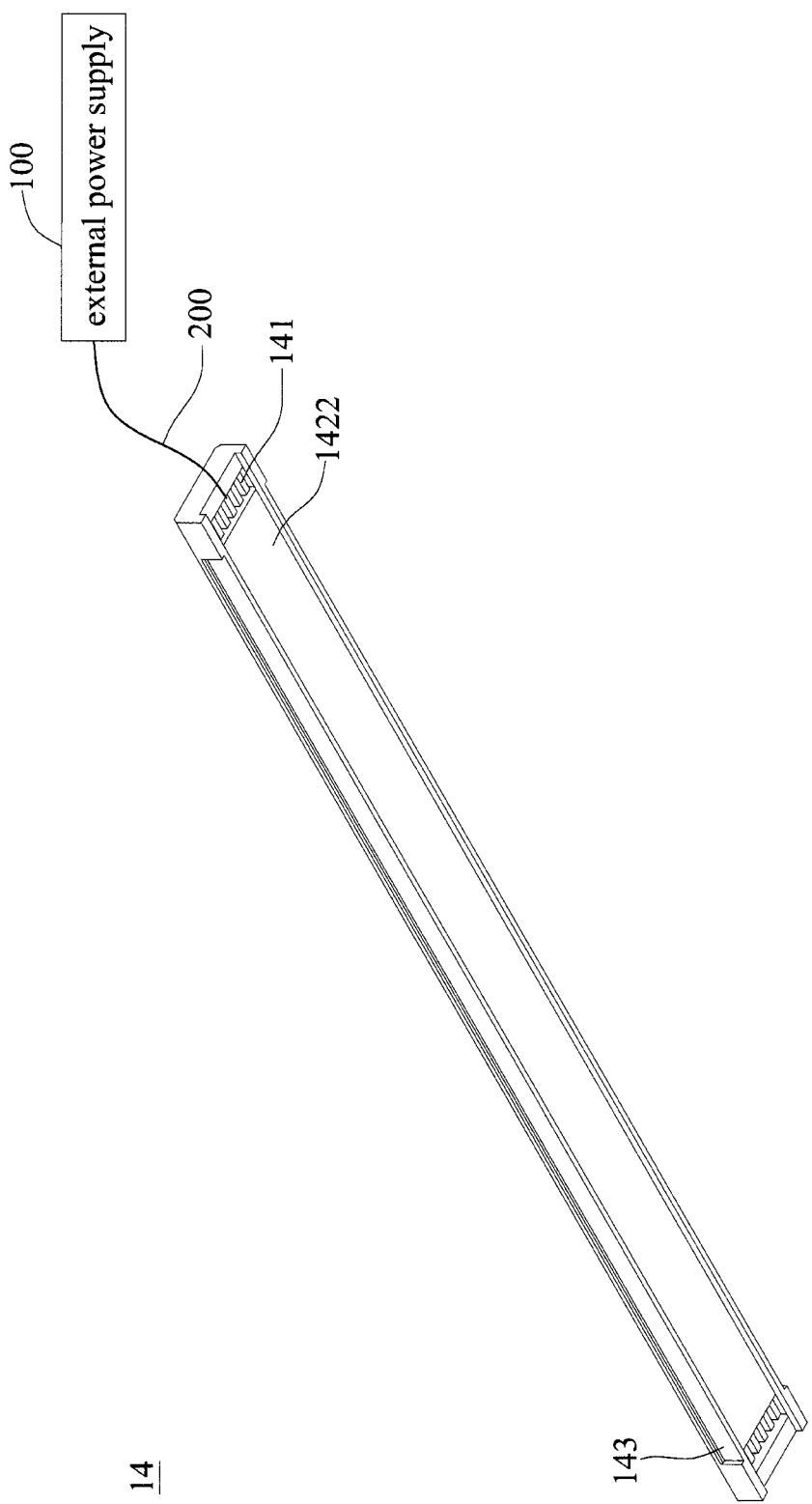

Referring to FIGS. 2A and 2B, the rail module 14 of the rail-type OLED lamp assembly 1 in accordance with the present disclosure is shown. As shown in FIG. 2A, the rail module 14 includes conductors 141 and a holder 142 having a plurality of rail grooves 1421. A conductor 141 is disposed in one of the rail grooves 1421. The conductors 141 are separated from and in no contact with each other.

In an embodiment, the holder 142 and the conductors 141 have an elongated shape. The elongated holder 142 defines the rail range within which the lamp module 11 can move. Moreover, the conductors 141 of the rail module 14 can be conductive electrode bars made of iron or stainless steel.

In an embodiment, six conductors for electrical control are shown, three of which are turned on, and the other three of which are turned off. In an embodiment, only two conductors are provided.

Trenches 143 corresponding to the pair of hooks 134 of the connector 13 are provided on either side of the rail module 14. The trenches 143 allow the hooks 134 of the connector 13 to be hooked thereto, such that the connector 13 can slide across the rail module 14.

As shown in FIG. 2B, the holder 142 includes a bottom plate 1422 for the conductors 141 to be placed thereon. The bottom plate 1422 does not extend all the way to the two bottom ends of the rail module 14, such that when seen from the bottom of the holder 142, the conductors 141 are partially exposed. The exposed conductors 141 can be connected to an external power supply 100 via conductive wires 200 (such as copper wires). Such a design allows the conductive wires 200 to be provided at the back of the rail-type OLED lamp assembly 1. This has the benefit of an aesthetic surface, and that the illumination and/or movement of the lamp module 11 are not affected by the conductive wires 200.

Figure 3A:
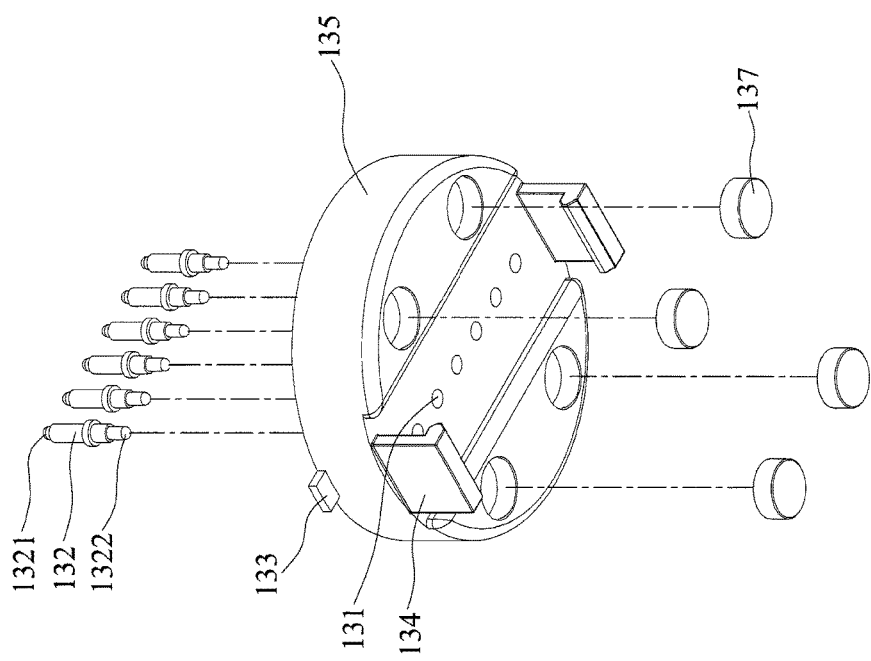
FIGS. 3A to 3C are diagrams illustrating a connector of the rail-type OLED lamp assembly in accordance with the disclosure.
Figure 3C:
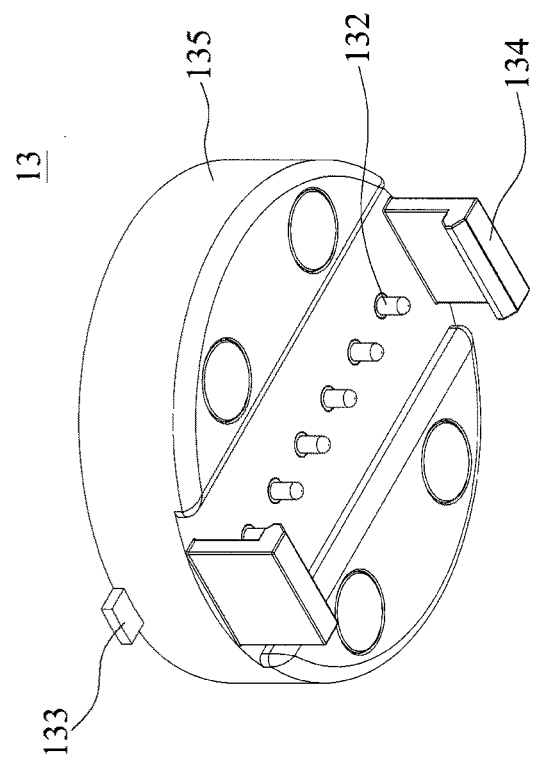
Figure 3B:
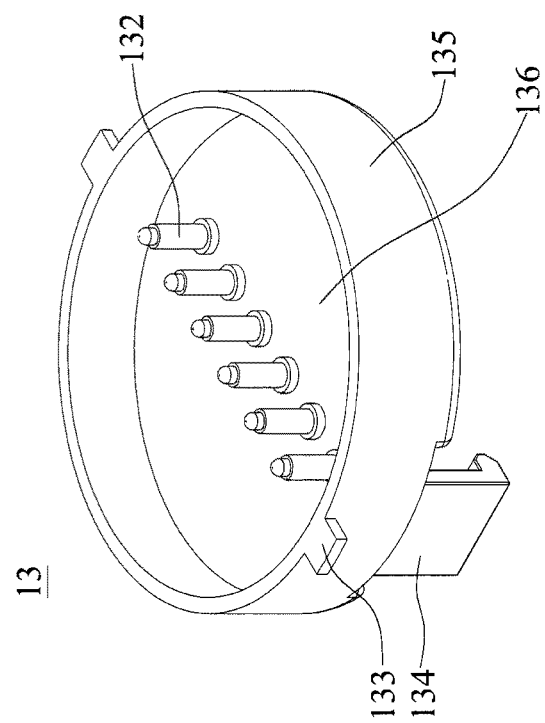

Referring to FIGS. 3A to 3C, the connector of the rail-type OLED lamp assembly in accordance with the present disclosure is shown. As shown in FIG. 3A, the connector 13 includes at least one through hole 131, and a conductive member 132 is provided in each of the through holes 131. The first ends 1321 of the conductive members 132 are in contact with the annular conductive coils 112 of the lamp module 11, while the second ends 1322 of the conductive members 132 are in contact with the conductors 141 of the rail module 14.

The conductive members 132 can be, but not limited to, double-headed spring probes. The benefit of double-headed spring probes is that both the top and the bottom ends can be pressed, such that the double-headed spring probes, when coming into contact with the conductors 141 of the rail module 14, may retract but be still in constant contact with the conductors 141.

As shown in FIG. 3A, six conductive members 132 are shown, and the connector 13 includes six through holes 131. The second end 1322 of each of the conductive members 132, after passing through the through holes 131, comes out of the bottom of the connector 13, so as to contact one of the conductors 141 of the rail module 14. After the conductive members 132 are assembled, the top view of the connector 13 is shown in FIG. 3B, while the bottom view of the conductive members 132 is shown in FIG. 3C. From this diagram, it can be seen that the second ends 1322 of the conductive members 132 protrude from the through holes 131.

The pair of ears 133 of the connector 13 is provided on the first end of the connector 13, while the pair of hooks 134 is provided on the second end of the connector 13. The pair of ears 133 of the connector 13 is to be inserted into the pair of indentations 122 of the annular member 12, so that the connector 13 can rotate within the protrusion portion 121.

As the pair of ears 133 of the connector 13 are horizontally provided on the first end of the connector 13, and the pair of hooks 134 are vertically provided on the second end of the connector 13, after the rail-type OLED lamp assembly 1 is assembled, the first end of the connector 13 faces towards the lamp module 11, and the second end of the connector 13 faces towards the rail module 14.

In order to increase the sliding ability, balls can be provided between the pair of hooks 134 of the connector 13 and the trenches 143 of the rail module 14 (not shown) to facilitate the sliding of the connector 13.

The hooks 134 are hooked to the rail module 14. However, other means can be adopted to provide the sliding motion between the two after they are joined together. For example, in a window rail design, trenches are provided at the outer edges of the rail module 14, the connector 13 can be wedged in the trenches, and the connector 13 can then slide in the rail module 14 with the help of balls. Therefore, the design of the hooks 134 is merely one of many possible implementations, and the present disclosure is not limited thereto.

In an embodiment, the connector 13 includes a concave circular body 135. The circular body 135 has a bottom 136 with the at least one through holes 131 provided therein. As described before, the conductive members 132 are to be inserted into the through holes 131 and pass through the bottom 136. Furthermore, the circular body 135 can be made of a plastic material and in the shape of a cylinder, but with a central concave portion. The central concave portion is used for receiving the conductive members 132.

The conductive members 132 are provided on an imaginary line between the pair of ears 133. This is done so that when the pair of ears 133 of the connector 13 is inserted into the indentations 122 of the annular member 12, the conductive members 132 are not in contact with the annular conductive coils 112 of the lamp module 11. After rotating the connector 13, the conductive members 132 are then in contact with the annular conductive coils 112 of the lamp module 11. The annular conductive coils 112 will be further described later.

The conductive members 132 are also provided on an imaginary line between the pair of hooks 134. Such a design makes sure that, when the connector 13 are hooked to the rail module 14, the conductive members 132 are always in contact with the conductors 141 of the rail module regardless of what sliding motion is performed.

In another embodiment, the bottom 136 of the connector 13 is provided with a plurality of magnets 137. This provides another connection means between the connector 13 and the rail module 14. Simply put, the conductors 141 of the rail module 14 can be magnetic metals, such as iron, galvanized iron, or the like. As such, when the connector 13 is provided on the rail module 14, in addition to engagement provided by the hooks 134, the connection between the two can be further strengthened through the magnetic attraction between the magnets 137 and the conductors 141. The magnets 137 are optional and can be provided as needed.

Figure 4B:
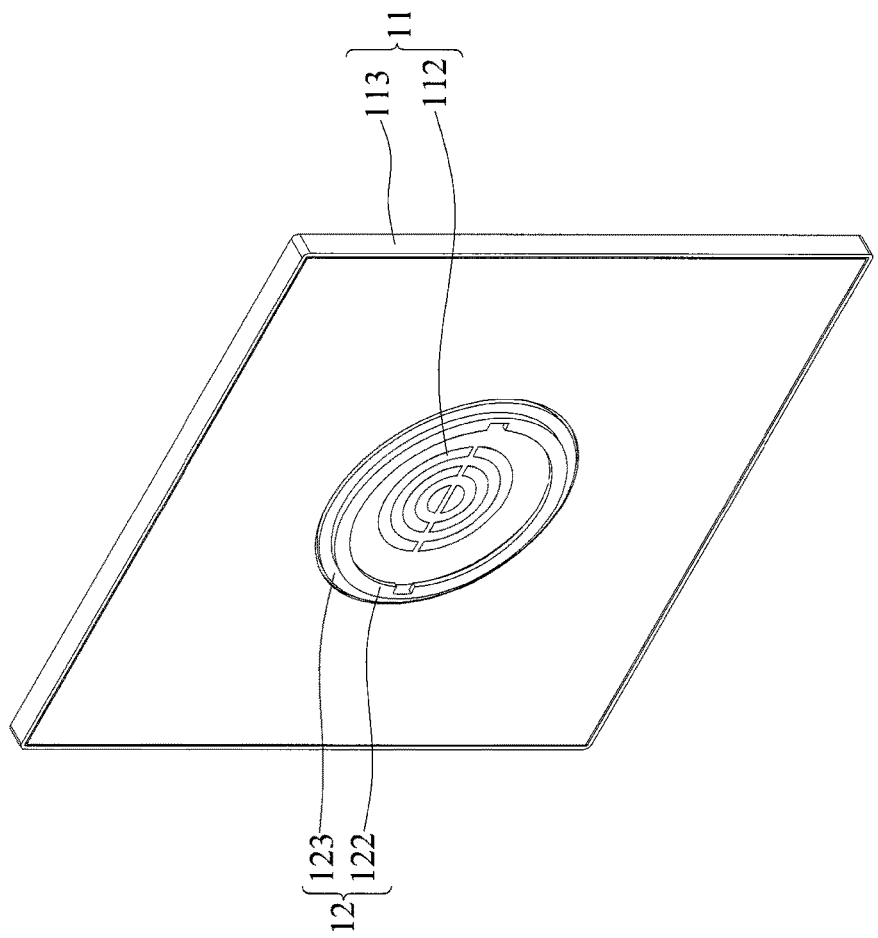

Referring to FIGS. 4A and 4B, the lamp module and the annular member of the rail-type OLED lamp assembly in accordance with the present disclosure are shown.

In addition to the OLED unit 111 provided at one side (i.e., top of FIG. 1) of the surface of the lamp module 11 shown in FIG. 1, the lamp module 11 also includes the at least one annular conductive coil 112 at the other side thereof. As shown in FIG. 4A, the annular conductive coils 112 are arranged concentrically.

The lamp module 11 also includes a frame body 113 and a circuit board 116. The OLED unit 111 is provided on one side of the frame body 113, so the at least one annular conductive coil 112 are to be provided on the other side of the frame body 113. The circuit board 116 is provided inside the frame body 113 for providing electrical connection between the at least one annular conductive coil 112 and the OLED unit 111. In an embodiment, the frame body 113 is an iron frame.

In an embodiment, the annular conductive coil 112 is provided on the circuit board 116.

The annular member 12 includes the protrusion portion 121, and the protrusion portion 121 has a pair of indentations 122. The protrusion portion 121 may be step-like, and form an annular inner space. The pair of indentations 122 allows the pair of ears 133 of the connector 13 to be inserted, and after rotating the connector 13, the connector 13 can be joined with the annular member 12.

In an embodiment, the indentations 122 can be designed to be smaller than the ears 133, so that the ears 133 have to be inserted at an angle with some force. This avoids that, upon rotating the connector 13, the ears 133 falling out of the indentations 122 when they happen to arrive at the indentations 122.

In another embodiment, the protrusion portion 121 further includes a stopper facing the side of the annular inner space near each of the indentations 122 (not shown). The connector 13, when rotating 180 degrees, will be stopped by the stoppers. Stoppers facing the side of the annular inner space are provided next to the indentations 122, so that the ears 133, when inserted into the indentations 122 and rotating towards the stoppers, will be stopped by the stoppers after about 180 degrees of rotation. This design reduces the possibility of the two elements from separating.

Furthermore, the annular member 12 includes an annular plate 123 that can be laid flat against the surface of the lamp module 11. The annular plate 123 includes a plurality of bumps 1231, which correspond to a plurality of recessed holes 115 on the frame body 113. The annular member 12 and the lamp module 11 are positioned and joined together through the bumps 1231 and the recessed holes 115. FIG. 4B shows the lamp module 11 after annular member 12 is connected thereto.

With respect to the design of the annular conductive coil 112, each of the annular conductive coils 112 further includes non-connecting portions 114 arranged symmetrically to each other. The non-connecting portions 114 are provided in alignment with the pair of indentations 122 of the annular member, such that when the connector 13 is just connected with the annular member 12, the electrical circuit is not connected. When the ears 133 of the connector 13 are inserted into the indentations 122, since arranged in line with the ears 133 (FIG. 3B), the conductive members 132 will first be in alignment with the non-connecting portions 114 of the annular conductive coils 112, and are not in contact with the annular conductive coil 112. When the connector 13 is rotated, the conductive members 132 rotate accordingly, and the conductive members 132 would then come into contact with the annular conductive coils 112, thereby turning on the electrical circuit.

In an embodiment, the annular conductive coils 112 are designed with three concentric circles. They can be in contact with six conductive members 132. In other words, except for the straight line formed by the non-connecting portions 114, when the connector 13 rotates to any angle, the six conductive members 132 can always come into contact with six points on the three concentric circles of the annular conductive coils 112, such that there will not be the case in which no electrical connection is formed after rotating the connector. Such a design allows the connector 13 to be rotatable without the issue of the connection of the electrical circuit.

Figure 5A:
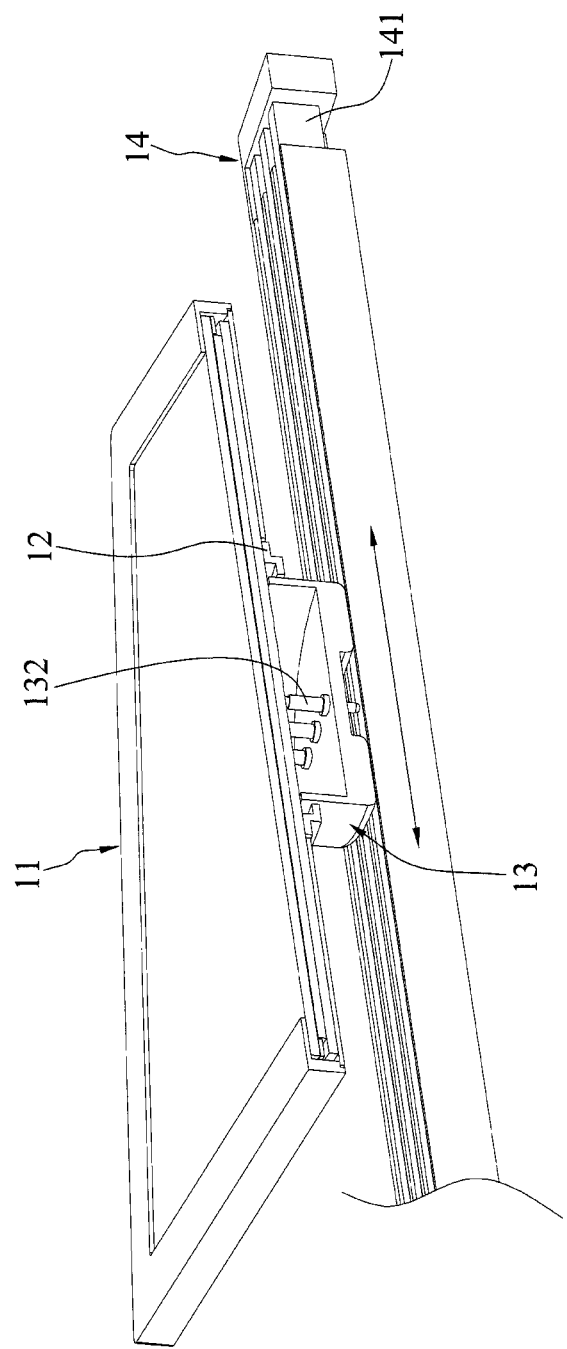
FIGS. 5A and 5B are schematic diagrams illustrating multi-dimensional freedom of movement of the rail-type OLED lamp assembly in accordance with the disclosure.
Figure 5B:
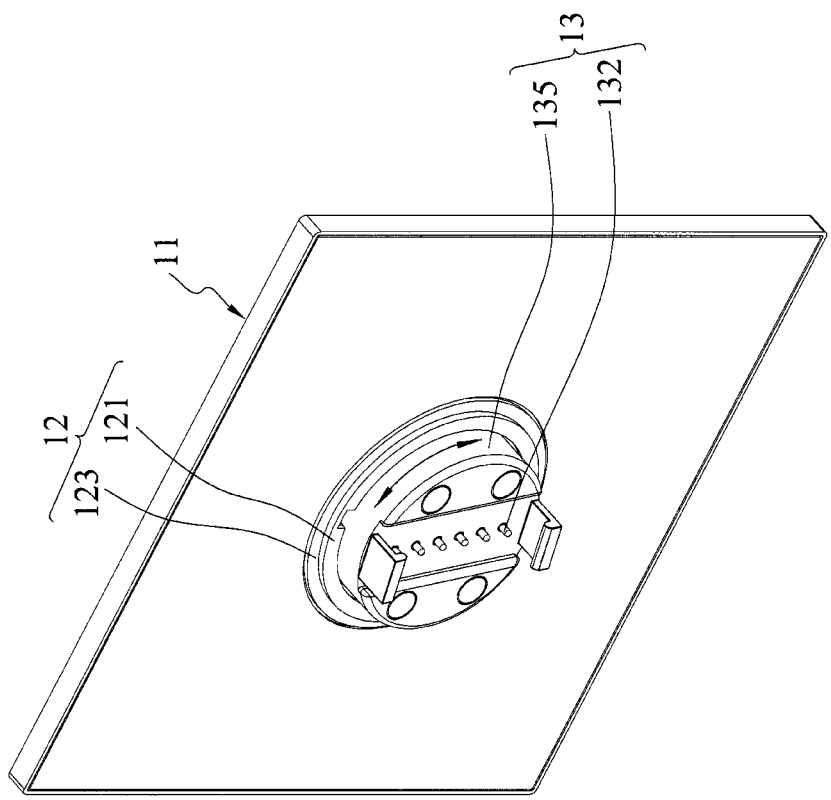

Referring to FIGS. 5A and 5B, schematic diagrams illustrating multi-dimensional freedom of movement of the rail-type OLED lamp assembly in accordance with the present disclosure are shown. After all the members are assembled, it can be seen from the cross-sectional diagram of FIG. 5A that the lamp module 11 is connected with the rail module 14 through the connector 13, and the annular conductive coils (not shown, refer to FIG. 3A at the same time) of the lamp module 11 are electrically connected with the conductors 141 of the rail module 14 through the conductive members 132. Regardless of where the connector 13 slides, the conductive members 132 still maintain contact with the conductors 141.

Referring to FIG. 5B, the lamp module 11 is connected to the connector 13 through the annular member 12. The annular plate 123 of the annular member 12 is laid flat against the lamp module 11. After the connector 13 is rotated, the conductive members 132 of the connector 13 are in contact with the annular conductive coils of the lamp module 11 (not shown, refer to FIG. 3A at the same time). At this time, the circular body 135 of the connector 13 can rotate with respect to the annular member 12, and the connector 13 remains in electrical connection with the annular conductive coils except for the starting position when the connector 13 is just inserted.

Figure 6:
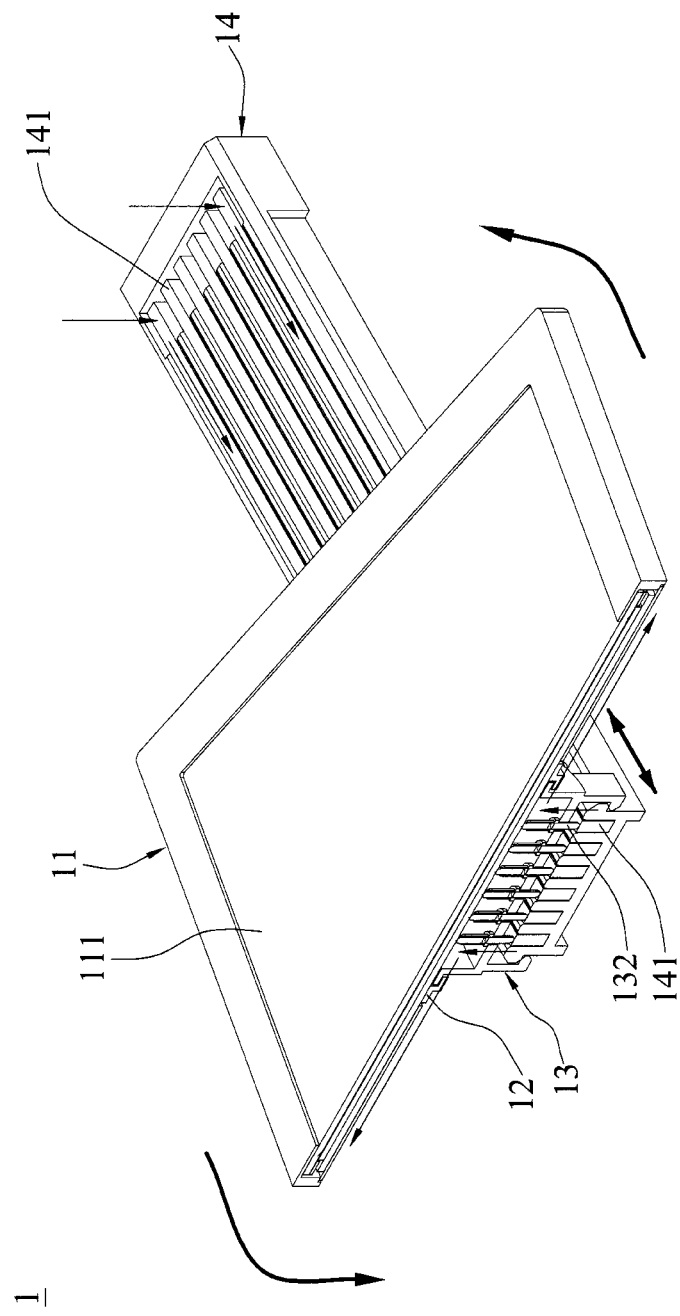
FIG. 6 is a schematic diagram illustrating electrical connection maintained by the rail-type OLED lamp assembly in accordance with the disclosure.

Referring to FIG. 6, a schematic diagram illustrating electrical connection maintained by the rail-type OLED lamp assembly in accordance with the present disclosure is shown. In addition to sliding in parallel on the rail module 14, the lamp module 11 can also rotate with respect to the rail module 14 owing to the fact that the connector 13 can rotate with respect to the annular member 12. Thus, the rail-type OLED lamp assembly 1 has high freedom of mechanical movement.

Moreover, the external power supply provides current to the conductors 141 of the rail module 14, which then flows through the conductive members 132 of the connector 13, and the annular conductive coils (not shown, refer to FIG. 3A at the same time) of the lamp module 11, and to the OLED unit 111. Regardless of the movements (sliding or rotating), the conductive members 132 allow electrical connection between the conductors 141 and the annular conductive coils of the lamp module 11.

Figure 7:
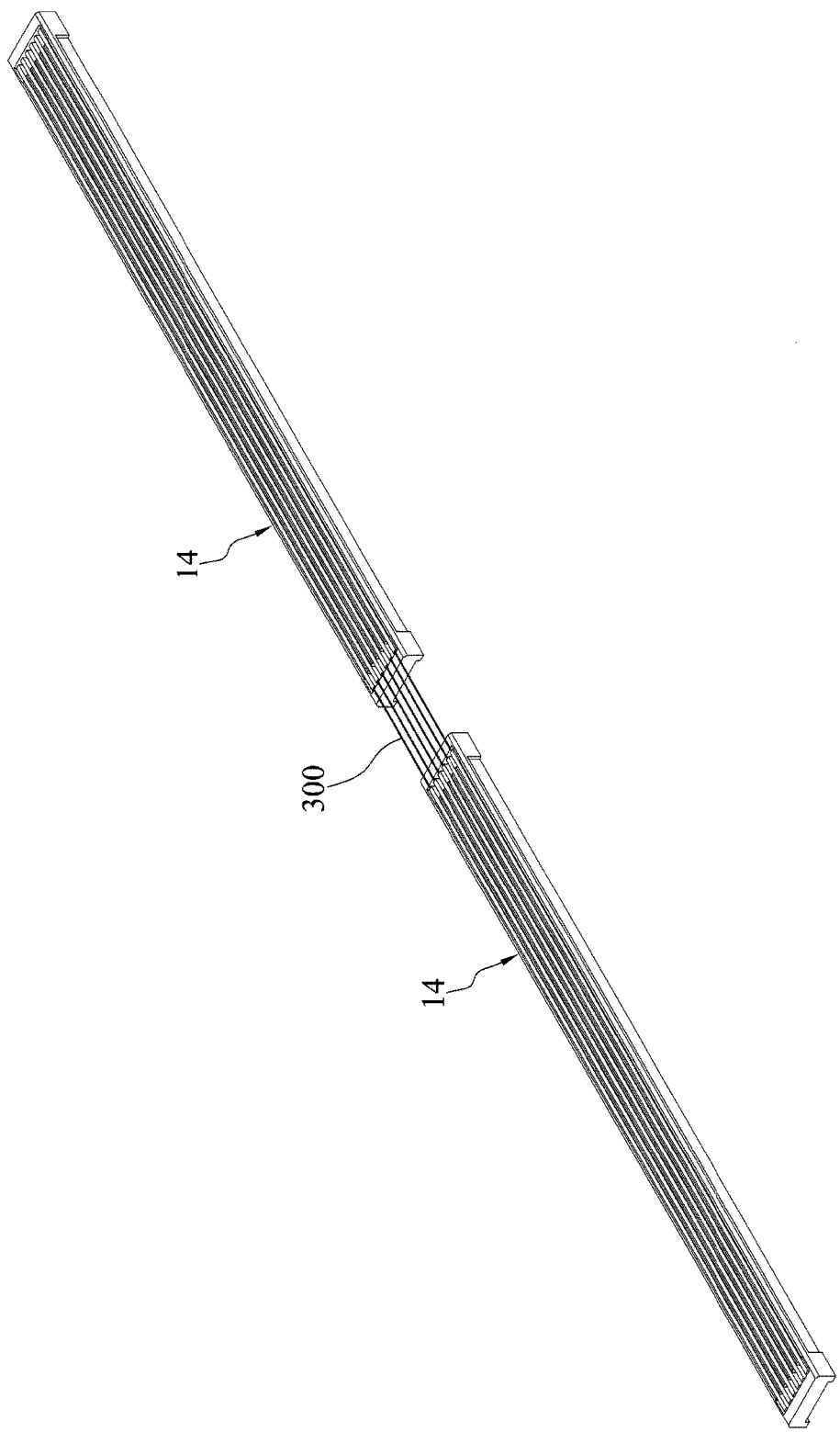
FIG. 7 is a schematic diagram illustrating the assembling of multiple rail modules in accordance with the disclosure.

Referring to FIG. 7, a schematic diagram illustrating the assembling of multiple rail modules in accordance with the present disclosure is shown. Each of the conductors of two rail modules 14 can be connected to each other correspondingly. In an embodiment, six conductors of one rail module 14 are connected to another six conductors of the other rail module 14 through wires 300. As such, power only needs to be provided at one end of the one of the rail modules 14, and can then be delivered to the corresponding conductors of the next rail module 14. This series architecture can be used in large-area applications.

In an embodiment, the annular conductive coils 112 are arranged concentrically, so that the conductive members 132 of the connector 13 can connect to them 360 degrees.

In summary, in the rail-type OLED lamp assembly according to the present disclosure, through the use of the connector between the lamp module and the rail module, relative shifting and rotation can be achieved while maintaining electrical connection between the two modules, such that the rail-type OLED lamp assembly has high freedom of mechanical movement, which is useful in many diverse lighting situations.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:
1. A rail-type lamp assembly, comprising:
   a lamp module including at least one conductive coil;
   an annular member connected with the lamp module and including a protrusion portion having a pair of indentations;
   a connector connected with the annular member and including at least one through hole, the connector comprising:
      a first end provided with a pair of ears; and
      a second end provided with a pair of hooks;
   a conductive member provided in the at least one through hole, a first end of the conductive member being in contact with the at least one conductive coil; and
   a rail module connected with the connector,
   wherein the connector is slidably hooked to the rail module through the pair of hooks, and after the pair of ears is inserted into the pair of indentations, the annular member is configured to be rotatable with respect to the connector.
2. The rail-type lamp assembly of claim 1, wherein the lamp module further includes:
   an OLED unit;
   a frame body having one side provided with the OLED unit; and
   a circuit board provided in the frame body and electrically connected with the OLED unit,
   wherein the at least one conductive coil is provided on the circuit board.
3. The rail-type lamp assembly of claim 1, wherein at least two of the conductive coils are arranged concentrically and each include a symmetrical non-connecting portion aligning with the pair of indentations.
4. The rail-type lamp assembly of claim 1, wherein the connector includes a circular body having a central concave portion with at least one through hole provided in a bottom of the circular body.
5. The rail-type lamp assembly of claim 4, wherein the conductive member is inserted into the at least one through hole of the central concave portion and penetrates through the bottom of the circular body.
6. The rail-type lamp assembly of claim 1, wherein the pair of ears is horizontally provided on the first end of the conductive member.
7. The rail-type lamp assembly of claim 1, wherein the pair of hooks is vertically provided on a second end of the conductive member.
8. The rail-type lamp assembly of claim 1, wherein the protrusion portion is step-like and has an annular inner space.
9. The rail-type lamp assembly of claim 8, wherein the protrusion portion includes at least one stopper provided adjacent one of the pair of indentations and facing the annular inner space.
10. The rail-type lamp assembly of claim 2, wherein the annular member includes an annular plate provided with a plurality of bumps.
11. The rail-type lamp assembly of claim 10, wherein the frame body has a plurality of recessed holes configured for engaging with the plurality of bumps.
12. The rail-type lamp assembly of claim 1, wherein the rail module includes at least one conductor in contact with a second end of the conductive member and a holder having a plurality of rail grooves.
13. The rail-type lamp assembly of claim 12, wherein the conductor is provided in at least one of the rail grooves.
14. The rail-type lamp assembly of claim 12, wherein the holder includes a bottom plate, and the conductor is provided on the bottom plate of the holder.
15. The rail-type lamp assembly of claim 14, wherein the bottom plate is free from fully extending to two ends of a bottom of the rail module with the conductor being partially exposed.
16. The rail-type lamp assembly of claim 12, wherein at least one of the holder and the conductor has an elongated shape.
17. The rail-type lamp assembly of claim 1, further comprising a plurality of trenches formed on two sides of the rail module and corresponding to the pair of hooks.
18. The rail-type lamp assembly of claim 1, further comprising a plurality of magnets provided on a bottom of the connector.
19. The rail-type lamp assembly of claim 1, wherein the conductive member is a double-headed spring probe.
20. The rail-type lamp assembly of claim 1, further comprising a plurality of balls provided between the pair of hooks and the rail module.
21. A rail-type lamp assembly, comprising:
   a lamp module including at least one conductive coil;
   an annular member connected with the lamp module and including a pair of indentations;

a connector connected with the annular member, the connector comprising:
a first end provided with a pair of ears; and
a second end provided with a pair of hooks;
a conductive member having a first end being in contact with the at least one conductive coil; and
a rail module connected with the connector,
wherein the connector is slidably hooked to the rail module through the pair of hooks, and the pair of ears is configured to be inserted into the pair of indentations.

* * * * *